United States Patent [19]

Mosiewicz

[11] Patent Number: 5,401,138
[45] Date of Patent: Mar. 28, 1995

[54] SYSTEM FOR FASTENING A HOLLOW EXTRUDED BLADE FOR AN AXIAL-FLOW FAN TO THE INSERTED SHANK OF THE BLADE

[75] Inventor: Robert Mosiewicz, Milan, Italy

[73] Assignee: Cofimco S.r.l., Milan, Italy

[21] Appl. No.: 177,343

[22] Filed: Jan. 4, 1994

Related U.S. Application Data

[63] Continuation of Ser. No. 965,530, Oct. 23, 1992, abandoned, which is a continuation of Ser. No. 667,760, Mar. 11, 1991, abandoned.

[30] Foreign Application Priority Data

Mar. 12, 1990 [IT] Italy ......................................... 20796

[51] Int. Cl.⁶ ............................................. B64C 11/24
[52] U.S. Cl. ..................................... 416/226; 416/223; 29/889.21; 29/889.3; 29/889.61; 29/889.72
[58] Field of Search ............... 416/223 R, 223 A, 224, 416/226, 232, 233, 239, 204 R, 210 R; 29/889.6, 889.61, 889.72, 889.21, 889.3

[56] References Cited

U.S. PATENT DOCUMENTS

| 1,969,781 | 8/1934 | De La Cierva | 416/226 |
|---|---|---|---|
| 2,067,228 | 1/1937 | Bennett | 416/226 |
| 2,070,657 | 2/1937 | Hafner | 416/226 |
| 2,183,158 | 12/1939 | Bennett | 416/204 R |
| 2,207,948 | 7/1940 | Sheridan | 416/226 |
| 2,412,908 | 12/1946 | Platt et al. | 416/226 |
| 3,551,070 | 12/1970 | Glucksman | 416/233 |
| 4,662,819 | 5/1987 | Lakowske et al. | 416/186 A |
| 4,971,521 | 11/1990 | Atarashi et al. | 416/233 |

FOREIGN PATENT DOCUMENTS

| 1168503 | 6/1984 | Canada . | |
| 0095807 | 12/1983 | European Pat. Off. . | |
| 0258926 | 3/1988 | European Pat. Off. . | |
| 0452611 | 8/1936 | United Kingdom | 416/226 |
| 0458312 | 12/1936 | United Kingdom | 416/233 |

Primary Examiner—Edward K. Look
Assistant Examiner—Christopher Verdier
Attorney, Agent, or Firm—Oliff & Berridge

[57] ABSTRACT

A hollow extruded axial flow fan blade which includes two internal longitudinal reinforcing elements (ribs) perpendicular to the blade profile and in which are inserted through bolts for fastening the blade to a round supporting bar inserted longitudinally in the blade. The fastening bolts are completely internal to said blade being parallel to the plane of revolution of the blade while passing diametrally and perpendicularly through the round supporting bar.

3 Claims, 5 Drawing Sheets

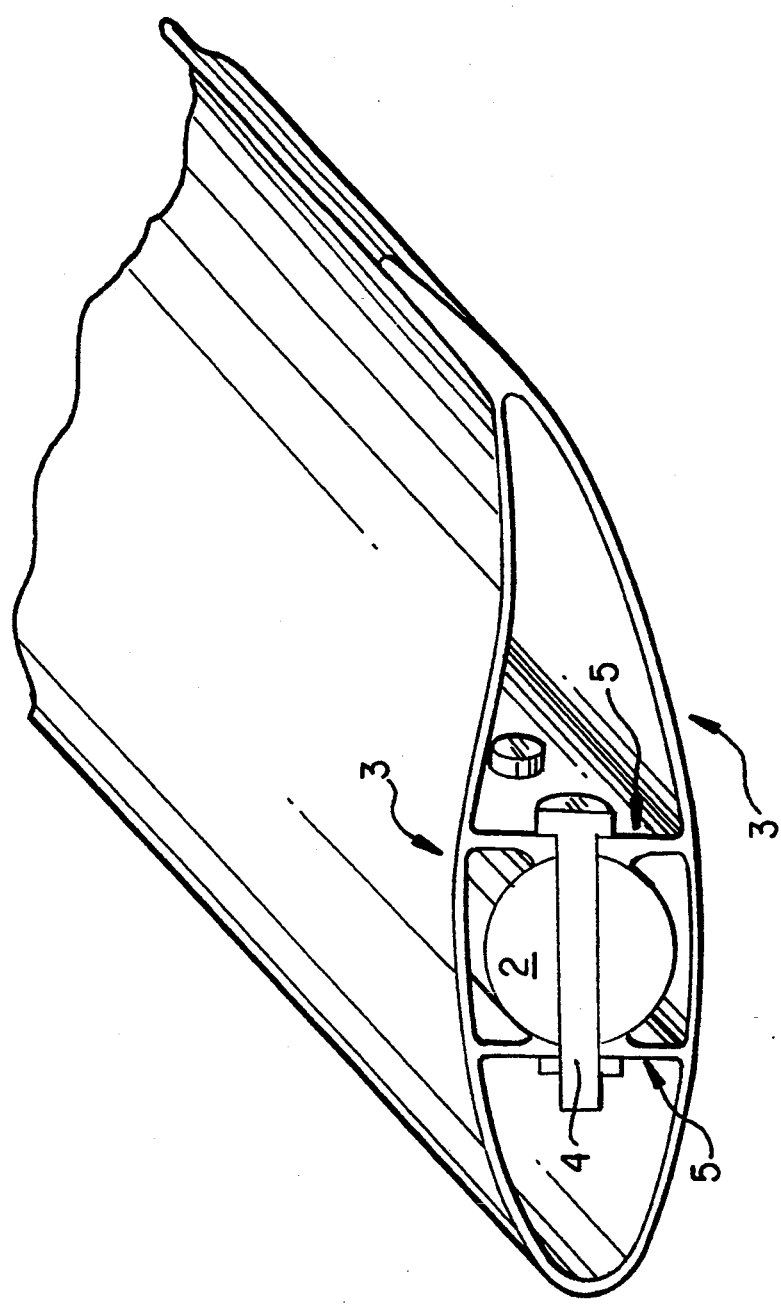

"a" and "b"

"c"

"a" and "b"

"c"

SYSTEM FOR FASTENING A HOLLOW EXTRUDED BLADE FOR AN AXIAL-FLOW FAN TO THE INSERTED SHANK OF THE BLADE

Which is a continuation of application Ser. No. 07/667,760, filed Mar. 11, 1991, now abandoned.

BACKGROUND OF THE INVENTION

1. Field of the Invention

This is a continuation of application Ser. No. 07/965,530 filed Oct. 23, 1992, now abandoned.

The present invention relates to a system for fastening a hollow extruded blade for an axial-flow fan to the solid round supporting bar inserted in said blade longitudinally. The solid round bar or 'blade shank' is fastened by the inner end to the hub of the fan.

2. Description of Related Art

Normally the solid round bar is fastened to the blade by bolts passing completely through the blade perpendicularly to the profile thereof.

When necessary the system can be reinforced in the involved zone by interposing appropriate elements, usually plates, placed on the front and/or rear face of the blade.

There are thus two basic prior art arrangements as; illustrated in FIG. 1.

BRIEF DESCRIPTION OF THE DRAWINGS

Referring now to the drawings which form a part of this original disclosure:

FIG. 2 is a cross-sectional view of the fan blade showing the internal through bolts used for fastening;

DETAILED DESCRIPTION OF THE PREFERRED EMBODIMENTS.

The new fastening method proposed by the present invention is based on the use of bolts 4 arranged parallel to the plane of rotation of the blade and completely internal to it and a corresponding internal structure of the blade comprising longitudinal reinforcements (ribs) 5 perpendicular to the profile in which the bolts are inserted. The bolts are at least two in number and pass diametrically and perpendicularly through the solid round bar or insert 2.

The arrangement is shown in FIG. 2.

The new proposed fastening method shows numerous advantages compared with the conventional methods.

Figure 1A:
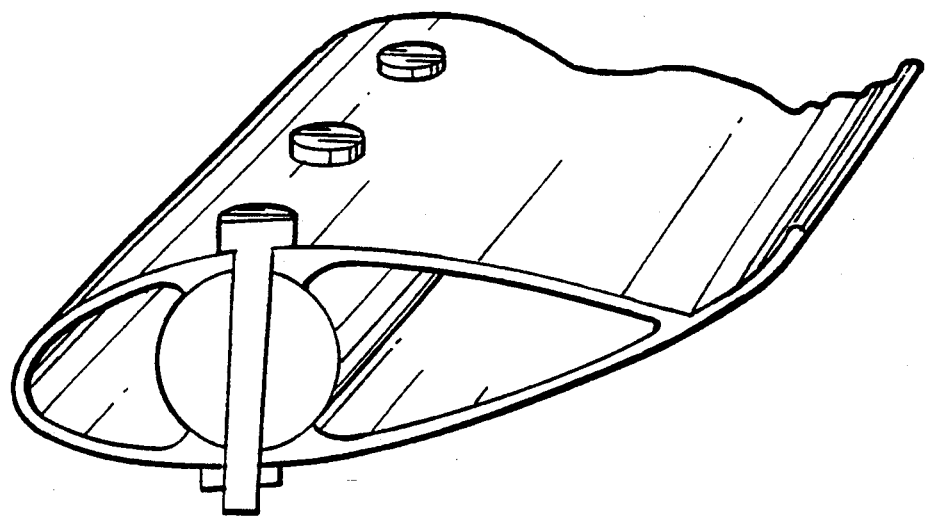
FIGS. 1A and 1B are cross-sectional views of two prior art blade arrangements.
Figure 1B:
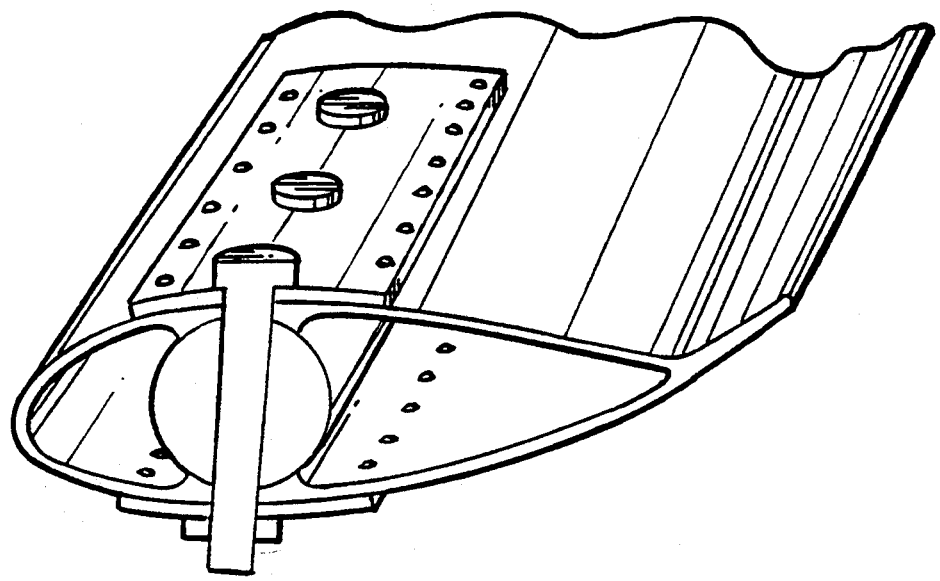
Figure 3:
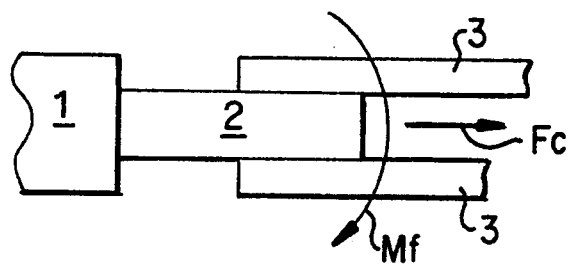
FIG. 3 is a schematic view showing the effects of bending moment Mf and centrifugal force Fc.
Figure 4:
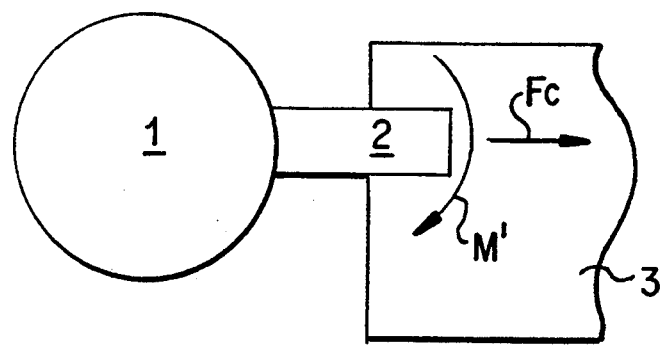
FIG. 4 is a schematic view showing the effects of twisting moment M and centrifugal force Fc during fan startup.

The principal ones are explained as follows:

(a) Better aerodynamics of the blade: in the 'c' configuration there are no parts protruding from the blade profile with the resulting obvious aerodynamic advantages, which can be summarized essentially in:

better efficiency of the blade and hence of the fan, less turbulence and consequently:
less noise,
lower level of nonstationary loads;

(b) Better structural strength of the insert: The forces acting on the insert are the following:

1) Operating fan It has been shown experimentally that a large percentage of the bending moment Mf, even up to 100%, has an alternating load, thus subjecting the material to fatigue, the effect of which is more critical than that of static loads [see FIG. 3 where (1) indicates the fan hub, (2) indicates the blade shaft or insert and (3) indicates the two walls of the blade];

2) Starting fan [see FIG. 4] Centrifugal force Fc and twisting moment M' can be considered static loads, being variable but with a frequency equal to the number of starts, hence extremely low. Considering that:

M' is normally much less than Mf

M' has (contrary to Mf) practically no effect from the point of view of fatigue damage, Fc is a static load (applied a number of times equal to the number of starts), the critical load for the root of the blade and the insert is Mf considered as an alternating load with frequency equal to n per revolution. It acts perpendicularly to the plane of the blade. Consequently the critical sections are:

a) for the insert:
the zone of greatest load and least structural strength, i.e. the section at the bolt hole nearest the hub;

b) for the blade.
the zone where the load has not yet been shifted from the blade to the insert, approximately at the end of said insert. The levels of stress in the critical section of the insert will now be analyzed, comparing configurations 'a' and 'b' with configuration 'c'.

Critical section

Figure 5:
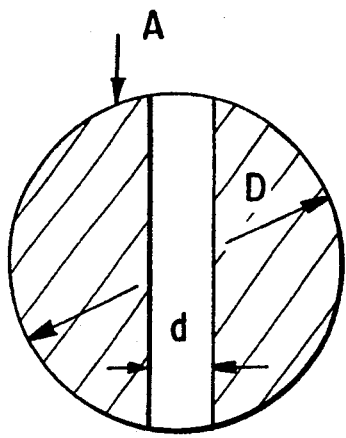
FIG. 5 is a schematic view showing configurations 'a' and 'b'.
Figure 6:
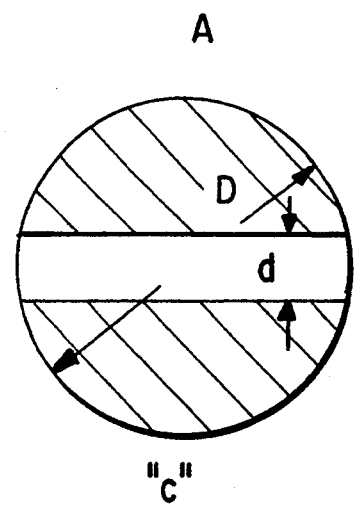
FIG. 6 is a schematic view of configuration 'c'.

Configurations 'a', 'b' [see FIG. 5]; Configuration 'c' [see FIG. 6]. Resisting moment of the section related to point A in the first case W, in the second case W':

$$W = \left( \frac{\pi D^3}{32} - \frac{D^2 \times d}{6} \right)$$

$$W' = \left( \frac{\pi D^3}{32} - \frac{D \cdot d^2}{6} \right)$$

Maximum stress at A:

$$\delta = Mf/W$$

$$\delta' = Mf/W'$$

Since $W' > W$ it follows that the maximum nominal bending stress in configuration 'c' is less than in configurations 'a' and 'b'. To give an idea of the percentage of improvement an example is shown using sufficiently typical and representative data:

D = 75mm
d = 12mm
Mf = 100000 kgmm
Configurations 'a', 'b':
$W = 30146$ mm$^3$
$\delta = 3.31$ kg/mm$^2$
Configuration 'c':

$W' = 39.596$ mm$^3$
$E' = 2.52$ kg/mm$^2$

The stress in configuration 'c' is 24% less than the stress in configurations 'a' and 'b'.

c) Minimal effect of the force concentration factor due either to the presence of the hole or to processing defects at said hole in the insert.

Due to the presence of the hole and/or to processing defects at said hole the concentration factor applies to the most stressed zone of the hole edges. The advantage of configuration 'c' compared with 'a' and 'b' is thus clear.

In fact, considering the critical fatigue load, i.e. the bending moment Mf, alternated with frequency $n \times$ revolution, in configuration 'c' the edge of the hole is at a distance $d/2$ from the neutral axis while in configurations 'a' and 'b' it is at a distance $D/2$.

It follows that in configuration 'c' the nominal stress to which the concentration factor applies is equal to $d/D$ with respect to the other configurations.

Obviously, for the same concentration factor, the final resulting stress is in the same advantageous relationship for configuration 'c'.

Using as an example the above case and assuming a concentration factor of 3 we have:

Configurations 'a' and 'b'   Configuration 'c'

| Mf | 100000 | kgmm | 100000 | kgmm |
|---|---|---|---|---|
| I | 1130493 | mm4 | 1541568 | mm4 |
| Y | 37.5 | mm | 6 | Mm |
| k | 3 | | 3 | |
| $\delta =$ Mfxy/I | 9.95 | kg/mm$^2$ | 1.16 | kg/mm 2 |

Figure 7A:
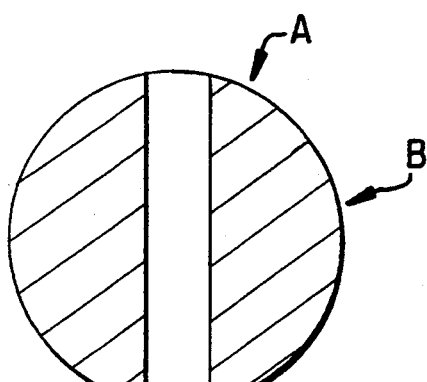
FIG. 7 is a schematic view comparing configurations 'a', 'b' with configuration 'c' at fan startup.
Figure 7B:
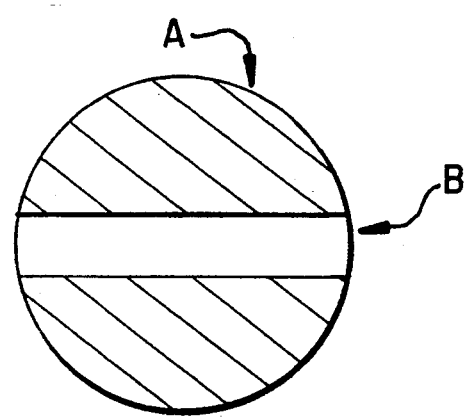

It can be seen that the beneficial effect is considerable. In the starting stage of the fan (see FIG. 7) the effect is obviously opposite, i.e. the stresses in configuration 'c' are higher than in configuration 'a' and 'b', but the effect is negligible because these loads are applied only a few times.

Summarizing and schematizing the example given in order by size, if the fan in question had 4 blades and rotated at 150 revolutions per minute for 5 years with one start per day and assuming for the sake of simplicity that the moment upon starting is Mf we have:

| | Configuration 'a' and 'b' | Configuration 'c' |
|---|---|---|
| Stresses/cycles in zone A | 9.95/1.57 10$^9$ 1.16/1825 | 2.43/1.57 10$^9$ 0/1825 |
| Stresses/cycles in zone B | 2.43/1825 0/1.57 10$^9$ | 9.95/1825 1.16/1.57 10$^9$ |

The advantage of configuration 'c' is evident.

d) There are no holes on the outside of the profile, which is more stressed, and as a result there is less possibility of formation of cracks due to fatigue. Indeed, the holes in configuration 'c' are near the neutral axis of the profile where stresses are extremely low. From this point of view, as concerns the profile, configuration 'c' is equivalent to configuration 'b' in which case the reinforcements also have the function of preventing fatigue damage originating at the holes in the outside of the profile. In this case also, however, configuration 'c' displays a clear advantage in terms of cost. If for particular applications it should be necessary in configuration 'c' to reinforce the root zone in order to increase safety margins, it would be possible to apply strengthening elements similarly to configuration 'b'.

Figure 8:
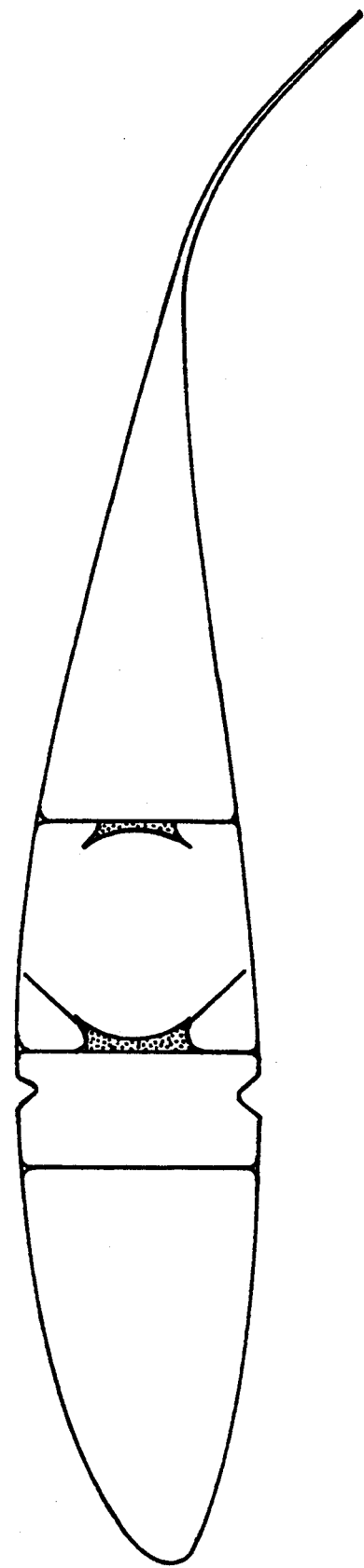
FIG. 8 is a cross-sectional view of a large blade configuration.

Assembling the blades in accordance with the invention requires the use of two or more fastening bolts to be screwed inside the hollow structure of the blade. This operation requires special tools for screwing. In case of large blades (see FIG. 8) made up of two or three longitudinal sections welded together upon assembly, the bolts are tightened to fasten the central section and then the side section (or sections) is (are) assembled and welded.

In another embodiment of the present invention the solid round supporting bar is fastened to the blade through an intermediate fastening element which is fixed on the rod by bolts parallel to the plane of revolution of the blade, said intermediate fastening element having external profile suitable for the internal hollow structure of the blade.

The fastening of the intermediate element to the blade can be carried out by riveting or bolting or other conventional means.

I claim:

1. A fan blade fastening system, comprising:
a hollow extruded axial flow fan blade having a smooth and uninterrupted outer surface, wherein the hollow extruded axial flow fan blade is fastened to a solid round supporting bar inserted longitudinally into the hollow extruded axial flow fan blade, the hollow extruded axial flow fan blade having two internal longitudinal reinforcing elements disposed perpendicular to a profile of the hollow extruded axial flow fan blade such that the reinforcing elements are extruded as an integral part of the hollow extruded axial flow fan blade, and
at least two through bolts, disposed parallel to a plane of revolution of the hollow extruded axial flow fan blade and each inserted through each of the two internal longitudinal reinforcing elements and the supporting bar for fastening the hollow extruded axial flow fan blade to the solid round supporting bar, each of the bolts being completely internal to the hollow extruded axial flow fan blade and passing diametrically and perpendicularly through the solid round supporting bar.

2. A fan blade fastening system, comprising:
a hollow extruded axial flow fan blade having a smooth and uninterrupted outer surface;
two internal longitudinal reinforcing elements disposed perpendicular to a profile of the extruded axial flow fan blade and which are extruded as an integral part of the extruded axial flow fan blade;
a solid round supporting bar inserted longitudinally in the extruded axial flow fan blade between the two internal longitudinal reinforcing elements;
at least two through bolts each inserted through each of the two internal longitudinal reinforcing elements and the supporting bar for fastening the extruded axial flow fan blade to the solid round supporting bar, each of the bolts being completely internal to the extruded axial flow fan blade, parallel to a plane of revolution of the extruded axial flow fan blade and passing diametrically and perpendicularly through the supporting bar.

3. A method for fastening a hollow extruded axial flow fan blade, comprising the steps of:
extruding a hollow axial flow fan blade such that an outer surface thereof is smooth and uninterrupted, with two extruded internal longitudinal reinforcing elements that are integral therewith and disposed perpendicular to a profile of the hollow extruded axial flow fan blade;

inserting a solid round supporting bar longitudinally into the hollow extruded axial flow fan blade; and fastening the hollow extruded axial flow fan blade to the solid round supporting bar by inserting at least two through bolts through each of the two reinforcing elements and the bar, the through bolts being disposed parallel to a plane of revolution of the hollow extruded axial flow fan blade and completely internal to the hollow extruded axial flow fan blade such that the through bolts pass diametrically and perpendicularly through the solid round supporting bar.

* * * * *